United States Patent [19]

Farkas

[11] Patent Number: 5,110,850
[45] Date of Patent: May 5, 1992

[54] HALOGEN-FREE, FLAME-RETARDANT THERMOPLASTIC POLYURETHANE CONTAINING MELAMINE

[75] Inventor: Julius Farkas, West Lake, Ohio

[73] Assignee: B. F. Goodrich Company, Akron, Ohio

[21] Appl. No.: 683,393

[22] Filed: Apr. 10, 1991

[51] Int. Cl.$^5$ ............................................ C08K 5/3492
[52] U.S. Cl. ...................................................... 524/100
[58] Field of Search .......................................... 524/100

[56] References Cited

U.S. PATENT DOCUMENTS

| | | | |
|---|---|---|---|
| 3,310,557 | 3/1967 | Kleemann | 524/100 |
| 4,143,029 | 3/1979 | Matthews et al. | 524/100 |
| 4,342,682 | 8/1982 | Halpern et al. | 524/100 |
| 4,542,170 | 9/1985 | Hall et al. | 524/100 |
| 4,670,483 | 6/1987 | Hall et al. | 524/100 |

FOREIGN PATENT DOCUMENTS

| | | |
|---|---|---|
| 51-4247 | 1/1976 | Japan . |
| 153458 | 6/1977 | Japan . |
| 0036352 | 3/1979 | Japan . |
| 016738 | 8/1983 | Japan . |
| 037465 | 9/1983 | Japan . |

Primary Examiner—Paul R. Michl
Assistant Examiner—Tae H. Yoon
Attorney, Agent, or Firm—Daniel J. Hudak; Robin S. Levine

[57] ABSTRACT

The present invention relates to thermoplastic polyurethane compositions rendered flame retardant by the use of derivative free melamine.

29 Claims, No Drawings

HALOGEN-FREE, FLAME-RETARDANT THERMOPLASTIC POLYURETHANE CONTAINING MELAMINE

FIELD OF THE INVENTION

The present invention relates to halogen-free flame retardant thermoplastic polyurethane compositions. The compositions are comprised of a non-foam thermoplastic polyurethane and melamine free of any derivative with no additional flame retardants.

BACKGROUND OF THE INVENTION

Previously, plastic materials were rendered flame retardant by incorporating chlorine- or bromine-containing species. Although halogens are efficient flame retardants, they might form undesirable products during combustion. They also tend to increase smoke generation.

U.S. Pat. No. 3,310,557 to Kleemann discloses amino substituted 2-amino-1,3,5-triazines, a process for the production thereof, their use for making dyeings and plastics fast to gas fading, as well as, industrial products.

U.S. Pat. No. 4,143,029 to Matthews et al, discloses a dripless, fire retarded, polyurethane elastomer comprising a blend of the elastomer with a hexaalkoxymethylmelamine, a trihydrocarbylcarbonylmelamine and compounds selected from the group comprising (1) aromatic bismaleimide or (2) an aromatic bismaleimide generator.

U.S. Pat. No. 4,342,682 to Halpern et al discloses thermoplastic polyurethane elastomer compositions comprising a polyurethane elastomer, a pentate salt of an amino-S-triazine, and optionally a polyol and flame retardant and intumescent and may be compounded to be self-extinguishing.

U.S. Pat. No. 4,542,170 issued to Hall et al, discloses flame retardant compositions comprising a pentate salt selected from melammonium pentate and the pentate salt of ammelide, and a nitrogen-containing phosphate selected from amine phosphates, ammonium phosphates, and ammonium polyphosphates, in an amount of 25 to 95 volume percent phosphate to 75 to 5 volume percent pentate salt which produced unexpected results in thermoplastic polyurethane compositions in terms of oxygen index, and UL-94 rating.

U.S. Pat. No. 4,670,483 issued to Hall et al, discloses flame retardant compositions comprising flame retardants selected from pentate salts and nitrogen-containing phosphates, wherein 1 or both are encapsulated in a material to reduce contacts between the flame retardant during processing and to thus reduce or eliminate pre-reaction between the two flame retardants, which pre-reaction, normally leads to degradation of flame proofing properties of the compositions.

Japanese Patent No. 51-4247 to Teijih, K. K., discloses polyurethane elastic polymers having resistance to yellowing caused by combustion gas of chlorine-containing bleaching agents made from amino-substituted triazine compounds.

Japanese Patent No. 153458 issued to Asahi Chemical, discloses stabilized polyurethane molding compositions containing S-triazine compounds.

Japanese Patent No. 016738 issued to Kanebo discloses non-flammable synthetic resin composition obtained by condensing 5-triazine derivatives with pyromellitic acid.

Japanese Patent No. 037465 to Kanebo discloses flame proof synthetic resin compositions containing an orthophthalic acid derivative made from triazine compounds.

SUMMARY OF THE INVENTION

Compositions of polyurethanes and melamine, free of any derivatives, are prepared with melamine as the sole flame retardant additive. The resulting compositions are flame retardant, in terms of oxygen index and UL-94 classification, are devoid of halogen-containing species and are non-blooming.

DETAILED DESCRIPTION OF THE INVENTION

The present invention relates to halogen-free flame retardant thermoplastic polyurethanes (TPU) wherein the urethane can be any conventional thermoplastic urethane as well as any thermoplastic urethane known to the art as well as to the literature. The urethane contains melamine, free of any derivatives, as the sole flame retardant additive.

The thermoplastic polyurethanes of the present invention are free of blowing agent, free of crosslinking agents, and/or blowing agent additives and melamine acts as the sole flame retardant. These polyurethanes are generally solid, non-foam urethanes. The thermoplastic elastomer polyurethanes of the present embodiment are generally prepared by reacting a polyisocyanate with an intermediate such as a hydroxyl terminated polyester, a hydroxyl terminated polyether, or mixtures thereof, and with one or more chain extenders of reactants generally known to the art and in the literature.

The hydroxyl terminated polyester intermediate of the intermediate is generally a linear polyester having a molecular weight of from about 500 to about 10,000, desirably from about 700 to about 5,000, and preferably from about 700 to about 4,000 an acid number generally less than 1.3 and preferably less than 0.8. The molecular weight is determined by assay of the terminal functional groups and is related to the number average molecular weight. The polymers are produced by (1) an esterification reaction of one or more glycols with one or more dicarboxylic acids or anhydrides or (2) by transesterification reaction, i.e., the reaction of one or more glycols with esters of dicarboxylic acids. Mole ratios generally in excess of more than one mole of glycol to acid are preferred so as to obtain linear chains having a preponderance of terminal hydroxyl groups. Suitable polyester intermediates also include various lactones such as polycaprolactone typically made from ε-caprolactone and a bifunctional initiator such as diethylene glycol. The dicarboxylic acids of the desired polyester can be aliphatic, cycloaliphatic, aromatic, or combinations thereof. Suitable dicarboxylic acids which may be used alone or in mixtures generally have a total of from 4 to 15 carbon atoms and include: succinic, glutaric, adipic, pimelic, suberic, azelaic, sebacic, dodecanedioic, isophthalic, terephthalic, cyclohexane dicarboxylic, and the like. Anhydrides of the above dicarboxylic acids such as phthalic anhydride, tetrahydrophthalic anhydride, or the like, can also be used. Adipic acid is the preferred acid. The glycols which are reacted to form a desirable polyester intermediate can be aliphatic, aromatic, or combinations thereof, and have a total of from 2 to 12 carbon atoms, and include ethylene glycol, 1,2-propanediol, 1,3-propanediol, 1,3-butanediol, 1,4-butanediol, 1,5-pentanediol, 1,6-hexanediol, 2,2-dimethyl-1,3-propanediol, 1,4-cyclohexanedimethanol, decamethylene glycol, dodecamethylene glycol, and the like. 1,4-butanediol is the preferred glycol.

Hydroxyl terminated polyether intermediates are polyether polyols derived from a diol or polyol having a total of from 2 to 15 carbon atoms, preferably an alkyl diol or glycol which is reacted with an ether comprising an alkylene oxide having from 2 to 6 carbon atoms, typically ethylene oxide or propylene oxide or mixtures thereof. For example, hydroxyl functional polyether can be produced by first reacting propylene glycol with propylene oxide followed by subsequent reaction with ethylene oxide. Primary hydroxyl groups resulting from ethylene oxide are more reactive than secondary hydroxyl groups and thus are preferred. Useful commercial polyether polyols include poly(ethylene glycol) comprising ethylene oxide reacted with ethylene glycol, poly(propylene glycol) comprising propylene oxide reacted with propylene glycol, poly(propylene-ethylene glycol) comprising propylene oxide and ethylene oxide reacted with propylene glycol, poly(tetramethylene glycol) comprising water reacted with tetrahydrofuran (PTMG). The latter polyether is preferred. Polyether polyols further include polyamide adducts of an alkylene oxide and can include for example ethylenediamine adduct comprising the reaction product of ethylenediamine and propylene oxide, diethylenetriamine adduct comprising the reaction product of diethylenetriamine with propylene oxide, and similar polyamide type polyether polyols. Copolyethers can also be utilized in the current invention. Typical copolyethers include the reaction product of THF and ethylene oxide or THF and propylene oxide. These are available from BASF as Poly THF B, a block copolymer, and poly THF R, a random copolymer. The various polyether intermediates generally have a molecular weight, as determined by assay of the terminal functional groups which is an average molecular weight, of from about 500 to about 10,000, desirably from about 500 to about 5,000, and preferably from about 700 to about 3,000.

The polycarbonate-based polyurethane resin of this invention is prepared by reacting a diisocyanate with a blend of a hydroxyl terminated polycarbonate and a chain extender. The hydroxyl terminated polycarbonate can be prepared by reacting a glycol with a carbonate.

U.S. Pat. No. 4,131,731 is hereby incorporated by reference for its disclosure of hydroxyl terminated polycarbonates and their preparation. Such polycarbonates are linear and have terminal hydroxyl groups with essential exclusion of other terminal groups. The essential reactants are glycols and carbonates. Suitable glycols are selected from cycloaliphatic and aliphatic diols containing 4 to 40, and preferably 4 to 12 carbon atoms, and from polyoxyalkylene glycols containing 2 to 20 alkoxy groups per molecule with each alkoxy group containing 2 to 4 carbon atoms. Diols suitable for use in the present invention include aliphatic diols containing 4 to 12 carbon atoms such as butanediol-1,4, pentanediol-1,4, neopentyl glycol, hexanediol-1,6, 2,2,4-trimethylhexanediol-1,6, decanediol-1,10, hydrogenated dilinoleylglycol, hydrogenated dioleylglycol; and cycloaliphatic diols such as cyclohexanediol-1,3, dimethylolcyclohexane-1,4, cyclohexanediol-1,4, dimethylolcyclohexane-1,3, 1,4-endomethylene-2-hydroxy-5-hydroxymethyl cyclohexane, and polyalkylene glycols. The diols used in the reaction may be a single diol or a mixture of diols depending on the properties desired in the finished product.

Polycarbonate intermediates which are hydroxyl terminated are generally those known to the art and in the literature. Suitable carbonates are selected from alkylene carbonates composed of a 5 to 7 membered ring having the following general formula:

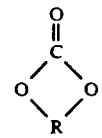

where R is a saturated divalent radical containing 2 to 6 linear carbon atoms. Suitable carbonates for use herein include ethylene carbonate, trimethylene carbonate, tetramethylene carbonate, 1,2-propylene carbonate, 1,2-butylene carbonate, 2,3-butylene carbonate, 1,2-ethylene carbonate, 1,3-pentylene carbonate, 1,4-pentylene carbonate, 2,3-pentylene carbonate, and 2,4-pentylene carbonate.

Also, suitable herein are dialkylcarbonates, cycloaliphatic carbonates, and diarylcarbonates. The dialkylcarbonates can contain 2 to 5 carbon atoms in each alkyl group and specific examples thereof are diethylcarbonate and dipropylcarbonate. Cycloaliphatic carbonates, especially dicycloaliphatic carbonates, can contain 4 to 7 carbon atoms in each cyclic structure, and there can be one or two of such structures. When one group is cycloaliphatic, the other can be either alkyl or aryl. On the other hand, if one group is aryl, the other can be alkyl or cycloaliphatic. Preferred examples of diarylcarbonates, which can contain 6 to 20 carbon atoms in each aryl group, are diphenylcarbonate, ditolylcarbonate, and dinaphthylcarbonate.

The reaction is carried out by reacting a glycol with a carbonate, preferably an alkylene carbonate in the molar range of 10:1 to 1:10, but preferably 3:1 to 1:3 at a temperature of 100° to 300° C. and at a pressure in the range of 0.1 to 300 mm of mercury in the presence or absence of an ester interchange catalyst, while removing lo boiling glycols by distillation.

More specifically, the hydroxyl terminated polycarbonates are prepared in two stages. In the first stage, a glycol is reacted with an alkylene carbonate to form a low molecular weight hydroxyl terminated polycarbonate. The lower boiling point glycol is removed by distillation at 100° to 300°, preferably at 150° to 250° C., under a reduced pressure of 10 to 30 mm Hg, preferably 50 to 200 mm Hg. A fractionating column is used to separate the by-product glycol from the reaction mixture. The by-product glycol is taken off the top of the column and the unreacted alkylene carbonate and glycol reactant are returned to the reaction vessel as reflux. A current of inert gas or an inert solvent can be used to facilitate removal of by-product glycol as it is formed. When amount of by-product glycol obtained indicates that degree of polymerization of the hydroxyl terminated polycarbonate is in the range of 2 to 10, the pressure is gradually reduced to 0.1 to 10 mm Hg and the unreacted glycol and alkylene carbonate are removed. This marks the beginning of the second stage of reaction during which the low molecular weight hydroxyl terminated polycarbonate is condensed by distilling off glycol as it is formed at 100° to 300° C., preferably 150° to 250° C. and at a pressure of 0.1 to 10 mm Hg until the desired molecular weight of the hydroxyl terminated polycarbonate is attained. Molecular weight of the hydroxyl terminated polycarbonates can vary from about 500 to about 10,000 but in a preferred embodiment, it will be in the range of 500 to 2500.

Suitable extender glycols (i.e., chain extenders) are lower aliphatic or short chain glycols having from about 2 to about 10 carbon atoms and include for instance ethylene glycol, diethylene glycol, propylene glycol, dipropylene glycol, 1,4-butanediol, 1,6-hexanediol, 1,3-butane diol, 1,5-pentanediol, 1,4-cyclohexanedimethanol hydroquinone di(hydroxyethyl) ether, neopentylglycol, and the like, with 1,4-butanediol being preferred.

The desired polyurethane is generally made from the above-noted intermediates such as a hydroxyl terminated polyester, polyether, or polycarbonate, preferably polyether, which is further reacted with a polyisocyanate, preferably a diisocyanate, along with extender glycol desirably in a so-called one-shot process or simultaneous coreaction of polyester or polyether intermediate, diisocyanate, and extender glycol to produce a high molecular weight linear polyurethane. The preparation of the macroglycol is generally well known to the art and to the literature and any suitable method may be used. The weight average molecular weight of the polyurethanes is generally about 80,000 to 500,000, and preferably from about 90,000 to about 250,000. The equivalent weight amount of diisocyanate to the total equivalent weight amount of hydroxyl containing components, that is the hydroxyl terminated polyester, polyether, or polycarbonate, and chain extender glycol, is from about 0.95 to about 1.10, desirably from about 0.96 to about 1.02, and preferably from about 0.97 to about 1.005. Suitable diisocyanates include aromatic diisocyanates such as: 4,4'-methylenebis-(phenyl isocyanate) (MDI); m-xylylene diisocyanate (XDI), phenylene-1,4-diisocyanate, naphthalene-1,5-diisocyanate, diphenylmethane-3,3'-dimethoxy-4,4'-diisocyanate and toluene diisocyanate (TDI); as well as aliphatic diisocyanates such as isophorone diisocyanate (IPDI), 1,4-cyclohexyl diisocyanate (CHDI), decane-1,10-diisocyanate, and dicyclohexylmethane-4,4'-diisocyanate. The most preferred diisocyanate is 4,4'-methylenebis(phenyl isocyanate) i.e., MDI.

In the one-shot polymerization process which generally occurs in situ, a simultaneous reaction occurs between three components, that is the one or more intermediates, the one or more polyisocyanates, and the one or more extender glycols, with the reaction generally being initiated at temperatures of from about 100° C. to about 120° C. Inasmuch as the reaction is exothermic, the reaction temperature generally increases to about 220°-250° C.

It is an important aspect of the present invention to utilize derivative-free melamine, which is the common name for 2,4,6-triamino-1,3,5-S-triazine listed at CAS registry number 108-78-1. The melamine of the present invention does not include derivatives of melamine, and is typically used in an amount of 30 to 40 percent by weight melamine based on TPU, and preferably 33 to 38 percent by weight based on TPU. Generally amounts less than 30 percent results in the loss of flame retardant properties, seen by a drop in oxygen index. Amounts of greater than 40 percent generally degrade the urethane mechanical properties.

The melamine can be purchased from Melamine Chemical, Inc. of Donaldsonville, La. The particle size of the melamine tends to affect the appearance of the final product. The particle size is generally less than 125 microns, desirably less than 62 microns, and the mean size micron is about 2-31 microns with 4-15 being preferred. Any size melamine can be used, but preferably super fine is used to impart a smoother surface to the extruded, molded parts.

The resulting TPU composition which is actually a blend or mixture of the TPU and the melamine tends to have values for oxygen index of greater than 30 and preferably about 32 or greater (measured using the standard procedure ASTM D-2863). The TPU/melamine composition generally achieves a V-O classification when tested according to the UL-94 vertical burn test.

Pigments which can be used in the invention include those known in the art, such as carbon black, titanium dioxide, and the like. The pigments can be used in amounts of from about 0 to about 4, desirably from about 0 to about 3, and most desirably from about 0 to about 2 parts by weight based on 100 parts by weight of the polyurethane.

In addition to the above, other conventional additives can be added such as antioxidants, antiozonates, light stabilizers, and talc which is known as a nucleating agent. However, it is an important aspect that the composition of the present invention is free of any flame retardants whatsoever, e.g. halogen flame retardants and non-halogen flame retardants, e.g. antimony oxide, with the sole exception being melamine.

The thermoplastic urethane component and the melamine is compounded by any means known to those skilled in the art and the literature. Preferably the thermoplastic urethane is melted at a temperature of about 150-200° C., desirably from about 160°-190° C. and preferably from about 170°-180° C., but the temperature depends on the particular TPU used. The TPU pellets and melamine powder are blended to form a physical mixture. The physical mixture is then fused in a mixing device, preferably a twin screw extruder. This results in the melamine being well dispersed throughout the TPU matrix. The compositions formed are non-blooming, i.e. the powder is well-dispersed and does not reside solely on the surface.

The invention will be better understood by reference to the following examples.

EXAMPLES 1 THROUGH 7

Summarized below is a general description for the preparation of Examples 1 through 7.

The TPU resins used were a poly(ether urethane) composed of PTMEG ($M_n$ 1000), 1,4-butanediol, and MDI, and a poly(ester urethane) composed of poly(tetramethylene adipate) glycol, 1,4-butanediol, and MDI.

The TPU resin was dried at 80° C. for 16 hours prior to use. Melamine crystal (ground or superfine) was used as received. The black concentrate (25 percent carbon black/75 percent polyether TPU) was dried at 80° C. for 16 hours prior to use.

The desired amounts of ingredients were weighed into a suitably sized polyethylene bag, then shaken thoroughly to prepare the physical blend. The physical blend was then melt blended in a counter-rotating twin screw compounding extruder. During compounding, the melt temperature was typically 175°-180° C.; and the screw RPM revolutions per minute were 40. The resulting strands were chopped, then compression molded to measure flammability properties. Recipes and flammability properties are summarized in Table I.

TABLE I[1]

|                          | 1    | 2    | 3    | 4    | 5      | 6      | 7   |
|--------------------------|------|------|------|------|--------|--------|-----|
| Polyester TPU            | —    | —    | —    | —    | —      | —      | 975 |
| Polyether TPU            | 700  | 670  | 640  | 2560 | 1437.5 | 1437.5 | —   |
| Melamine (ground)        | 300  | 330  | 360  | —    | 828.0  | —      | —   |
| Melamine (superfine)     | —    | —    | —    | 1440 | —      | 828.0  | 525 |
| Black concentrate        | —    | —    | —    | —    | 34.5   | 34.5   | —   |
| Vertical Burn (UL-94)[2] | V-O  | V-O  | V-O  | V-O  | V-O    | V-O    | V-O |
| Oxygen Index (ASTM D2863)[3] | 29.4 | 30.2 | 31.3 | 32 | 32   | 33     | 32  |

[1] Amounts of ingredients are given in grams.
[2] Sample thickness: 0.075"
[3] Sample thickness: 0.125"

Table I shows vertical burn values of V-O were obtained for Examples 1 through 7. Table I also shows good oxygen index values were achieved for Examples 1 through 7.

EXAMPLE 8

A physical mixture of polyether TPU (64 percent by weight) and superfine melamine crystal (36 percent by weight) was prepared in a ribbon blender. The mixture was then melt blended in a co-rotating twin screw extruder equipped with a strand die head containing 8 holes, each of ¼" diameter; the physical mixture was fed into the extruder by using an Acrison loss-in-weight continuous screw/auger feeder. The screw revolutions per minute were 90. The zone temperatures were as follows: Zone 2, 130° C.; Zone 3, 180° C.; Zone 4, 140° C., and Zone 5, 135° C.

The strands were pelletized, then extruded on a 1¼" single screw extruder as 6: wide, 30 mil thick cast strip. The strip had a smooth surface appearance. Physical properties were measured either on the cast strip or compression molded plaques. Properties are summarized in Table II.

TABLE II

| PROPERTY UNITS | ASTM METHOD | VALUE |
|---|---|---|
| Shore Hardness | D2240 | 90 Shore A |
| Specific Gravity | D792 | 1.24 — |
| Tensile Strength | D412 | 2197 psi |
| Ultimate Elongation | D412 | 477% |
| Tensile Stress @ 100% Elongation | D412 | 1352 psi |
| Tensile Stress @ 300% Elongation | D412 | 1425 psi |
| Compression Set | | |
| 22 hrs. @ 23° C. | D395 | 42% |
| 22 hrs. @ 70° C. | D395 | 81% |
| Vicat | D1525 | 83° C. |
| Taber Abrasion H-18 wheel 1000 cycles 100 g load | D1044 | 477 mg |
| Water Absorption | D579 | 0.38% |
| Tear Resistance | D624, Die C | 330 lb./in. |
| Trouser Tear | D470 | 138 lb./in. |
| Flammability | | |
| Vertical Burn | UL-94 (0.075 in.) | V-0 — |
| Oxygen Index | D2863 (0.125 in.) | 31% |

Table II illustrates the retention of physical properties for Example 8, and also the good vertical burn and oxygen index values.

This invention is particularly useful in the wire and cable jacket industry as well as for blown films due to the good flame retardant properties demonstrated. While in accordance with the Patent Statutes, the best mode and preferred embodiment has been set forth, the scope of the invention is not limited thereto, but rather by the scope of the attached claims.

What is claimed is:

1. A halogen-free flame retardant urethane composition comprising:
   a thermoplastic polyurethane (TPU); and a sole flame retardant, wherein said sole flame retardant is melamine that is derivative free.

2. The composition as in claim 1, wherein said melamine is present in an amount of about 30 to about 40 percent by weight based on said TPU.

3. The composition as in claim 1, wherein said melamine has a particle size of about 125 microns or less.

4. The composition as in claim 1, wherein said TPU has a weight average molecular weight of from about 80,000 to 500,000.

5. The composition as in claim 4, wherein said TPU is derived from a polyester intermediate, a polycarbonate intermediate, or a polyether intermediate.

6. A composition as in claim 5, wherein said TPU is derived from a polyether intermediate, MDI, and butanediol.

7. The composition as in claim 1, wherein said composition further comprises a pigment in an amount of up to about 4 parts based on 100 parts by weight TPU.

8. The composition as in claim 1, wherein said melamine is present in an amount of about 33 to about 38 percent by weight based on said TPU.

9. The composition as in claim 8, wherein said TPU is made from a polyether intermediate, MDI, and butane diol.

10. The composition as in claim 8, wherein said melamine has a particle size of about 62 microns or less.

11. The composition as in claim 7, wherein said TPU has a weight average molecular weight of from about 90,000 to about 250,000.

12. A thermoplastic polyurethane blend comprising; an effective amount of derivative-free melamine such that the flame retardancy value is less than V-O according to UL-94.

13. The blend as in claim 12, wherein said blend further comprises a pigment in an amount of up to 4 parts based on 100 parts by weight of said TPU.

14. A blend as in claim 12, wherein said melamine is present in an amount of about 30 to about 40 percent by weight based on said TPU.

15. A blend as in claim 14, wherein said TPU has a number average molecular weight of about 80,000 to about 500,000.

16. The blend as in claim 12, wherein said melamine is present in an amount of 33 to 38 percent by weight based on said TPU.

17. The blend as in claim 16, wherein said TPU has a weight average molecular weight of from about 90,000 to about 250,000.

18. The blend as in claim 12, wherein said melamine has a particle size of less than about 125 microns.

19. The blend as in claim 18, wherein said TPU is derived from a polyether intermediate, MDI, and butane diol.

20. A process for producing a halogen-free flame retardant thermoplastic polyurethane comprising the steps of:
   melting said TPU, and
   blending said melted TPU with derivative-free melamine.

21. The process as in claim 20, wherein the amount of said melamine is from about 30 to about 40 percent by weight based on said TPU.

22. The process as in claim 20, wherein said melamine is present in an amount of about 33 to about 38 percent by weight based on said TPU.

23. A process as in claim 22, wherein said melamine has a particle size of 125 microns or less.

24. A process as in claim 23, wherein said TPU is derived from a polyether intermediate, MDI, and butane diol.

25. A wire or a cable jacket comprising the composition of claim 1.

26. A wire, or a cable jacket comprising the composition of claim 6.

27. A wire or a cable jacket made from the blend of claim 19.

28. A blown film comprising the blend of claim 1.

29. A blown film comprising the blend of claim 19.

* * * * *